United States Patent [19]

Palmer et al.

[11] 4,388,292
[45] Jun. 14, 1983

[54] PROCESS FOR REDUCING RADIOACTIVE CONTAMINATION IN PHOSPHOGYPSUM

[75] Inventors: Jay W. Palmer, Temple Terrace, Fla.; John C. Gaynor, Des Plaines, Ill.

[73] Assignee: United States Gypsum Company, Chicago, Ill.

[21] Appl. No.: 330,550

[22] Filed: Dec. 14, 1981

[51] Int. Cl.³ .................. C01F 11/46; C01F 13/00; C01B 25/16; G21F 9/28
[52] U.S. Cl. ........................ 423/555; 423/2; 423/11; 423/167; 423/170; 423/321 R; 106/109; 252/626
[58] Field of Search .................... 106/109, 110, 111; 423/2, 10, 18, 168, 170, 171, 172, 555, 166, 167, 319, 321 R; 252/301.1 W, 626

[56] References Cited

U.S. PATENT DOCUMENTS

| | | | |
|---|---|---|---|
| 2,006,342 | 7/1935 | Booge et al. | 423/555 |
| 2,151,331 | 3/1939 | Roberts | 423/555 |
| 2,531,977 | 11/1950 | Hammaren et al. | 423/321 |
| 2,956,859 | 10/1960 | Rodgers | 423/555 |
| 3,574,648 | 4/1971 | Wirsching et al. | 423/555 |
| 3,847,766 | 11/1974 | Klaus | 423/555 |
| 3,906,083 | 9/1975 | George | 423/555 |
| 3,949,047 | 4/1976 | Cherdron et al. | 423/555 |
| 3,951,675 | 4/1976 | Krempff | 106/109 |
| 4,146,568 | 3/1979 | Lange, Jr. | 423/170 |
| 4,282,192 | 8/1981 | Larson | 423/555 |
| 4,311,677 | 1/1982 | Gerunda et al. | 423/321 R |
| 4,328,193 | 5/1982 | Larson | 423/555 |

FOREIGN PATENT DOCUMENTS

| | | | |
|---|---|---|---|
| 31793 | 7/1981 | European Pat. Off. | 423/168 |
| 1904496 | 8/1970 | Fed. Rep. of Germany | 423/172 |
| 577970 | 6/1946 | United Kingdom | 423/170 |
| 1103206 | 2/1968 | United Kingdom | 423/170 |
| 1394734 | 5/1975 | United Kingdom | 423/555 |

OTHER PUBLICATIONS

Takatsu et al., Some Factors Related to the Hydration of Anhydrite, Sekko to Sekkai, #75, pp. 314–317, 1965.
Leininger et al., Rapid Conversion of Anhydrite to Gypsum 1 & EC, vol. 49, #5, May 1957, pp. 818–821.
Conley, Robert F., The Hydration Reaction of Anhydrite, PhD Thesis, Indiana University, Sep. 1958.

Primary Examiner—Gary P. Straub
Attorney, Agent, or Firm—Kenneth E. Roberts; Robert H. Robinson; Samuel Kurlandsky

[57] ABSTRACT

A process of two crystallization stages for reducing radioactive contamination of phosphogypsum is disclosed. In the process anhydrite crystals are obtained through dehydration of the radiation containing phosphogypsum in strong sulfuric acid; a portion of the anhydrite crystals containing the radioactive contamination is converted to substantially radiation free gypsum by crystallizing out on a large solids concentration of radiation free gypsum seed crystals; and coarse radiation free gypsum crystals are separated from small anhydrite crystal relics containing substantially all of the radioactive contamination.

17 Claims, 4 Drawing Figures

STABILITY DIAGRAM - $CaSO_4$ IN $CaSO_4 \cdot H_2SO_4 \cdot H_2O$ SYSTEM

PROCESS FOR REDUCING RADIOACTIVE CONTAMINATION IN PHOSPHOGYPSUM

BACKGROUND OF THE INVENTION

1. Field of the Invention

This invention relates to a process for reducing the radioactive contamination in waste product phosphogypsum.

In the industrial production of phosphoric acid by the wet methods phosphate rock is reacted with concentrated sulfuric acid for simultaneously producing both phosphoric acid solutions and calcium sulfate products. The calcium sulfate, which may be recovered as the dihydrate or phosphogypsum, the hemihydrate, or the anhydrite is contaminated with most of the impurities originally present in the phosphate ores. In the past, these calcium sulfate products were generally discarded as unwanted by-products because of the impurities; and large ponds and piles of these materials can be found at most phosphoric acid plants.

In attempts to produce marketable products from the heavily contaminated gypsums, extensive purification operations and alteration of phosphoric acid production conditions have been attempted without practical success. Most of these attempts have focused on other impurities, and radioactive contaminants remain even after extensive washing and elutriation and other process modifications. Typical phosphogypsum from the Prayon and modified Prayon processes contains about 25 picoCuries per gram of radiation, measured as radium 226. This contamination has become of increasing concern to governmental regulatory agencies and the industry itself. The radium imparts a slight radioactivity to the gypsum which may be dangerous even in the minute levels involved in industrial or construction products made from that material. It is possible that limitations will be placed upon radioactive levels for further stockpiling of this phosphogypsum. For example 5 pCi/g has been proposed as an upper limit on phosphogypsum by the Environmental Protection Agency of the United States.

2. Description of the Prior Art

There has been little prior concern for reducing radioactivity of phosphogypsum. U.S. Pat. No. 3,949,047 and U.S. Pat. No. 4,282,192 disclose treatment of the monocalcium phosphate (MCP) solution prior to the precipitation of the calcium sulfate. In the former, the MCP is treated by addition of barium compounds to reduce radium contamination, and in the latter, the MCP is treated with a sequestering agent and a first calcium sulfate precipitate high in radium is discarded. U.S. Pat. No. 4,146,568 discloses a process for reducing radioactive contamination in the phosphogypsum itself by slurrying it with a dilute sulfuric acid containing barium sulfate and separating the solids resultant therefrom into fine and coarse fractions. It is indicated that the fine fraction predominates in the radioactive contamination. It is not indicated proportionally how much of the starting phosphogypsum is recoverable, but losses could be considerable.

Published European patent application No. 12,487 of June 25, 1980 discloses that phosphogypsum can be converted to anhydrite by treatment with 60% sulfuric acid at 60° C. for 20 minutes. The obtained anhydrite particles are said to be 2.5 micrometers long and 0.5 micrometers thick.

From the above, there is still a need in the art for effective and economical means for removing a substantial portion of the radium that originates in phosphate rock. Furthermore, there is a need in the art for making calcium sulfate products that have acceptable levels of radium such that they may be utilized in wallboard and other industrial and construction materials. There is need at the present time to provide improved processes for reducing the radioactive contaminants in waste product phosphogypsum. The process of the present invention offers a solution to these needs.

SUMMARY OF THE INVENTION

It has now been found that phosphogypsum can be converted to an anhydrite crystal in a very rapid fashion in a narrow range of sulfuric acid concentrations and temperatures; and further that by utilizing substantial amounts of recycled gypsum seed crystals with the resultant anhydrite solution containing radioactive contamination, a second purifying recrystallization can be achieved rapidly. Finally, coarse, substantially radiation free gypsum crystals may be separated in conventional phosphate industry classification equipment from the relatively small sized anhydrite crystal relics containing the radioactive contamination.

The present invention broadly comprises reducing radioactivity in phosphogypsum by first dehydrating that material to calcium sulfate anhydrite. The radioactivity at this stage appears to remain in the calcium sulfate lattice. By then allowing a portion of the calcium sulfate to rehydrate and recrystallize on the surfaces of purified gypsum seed crystals large substantially radiation free gypsum crystals are obtained. The radioactivity remains in the anhydrite crystals; and by controlling the portion of anhydrite allowed to hydrate, coarse, substantially radiation free gypsum crystals and small anhydrite crystal relics containing substantially all of the radioactive contamination are obtained and readily separated.

In a preferred embodiment, the present invention involves, as depicted in FIG. 2, two sequential recrystallizations of the phosphogypsum (dehydration and rehydration) and sequential separations (in the settlers) to separate diluted sulfuric acid, to separate anhydrite crystal relics in which radioactivity is concentrated and to separate substantially radiation-free calcium sulfate dihydrate product.

DESCRIPTION OF THE PREFERRED EMBODIMENTS

Figure 1:
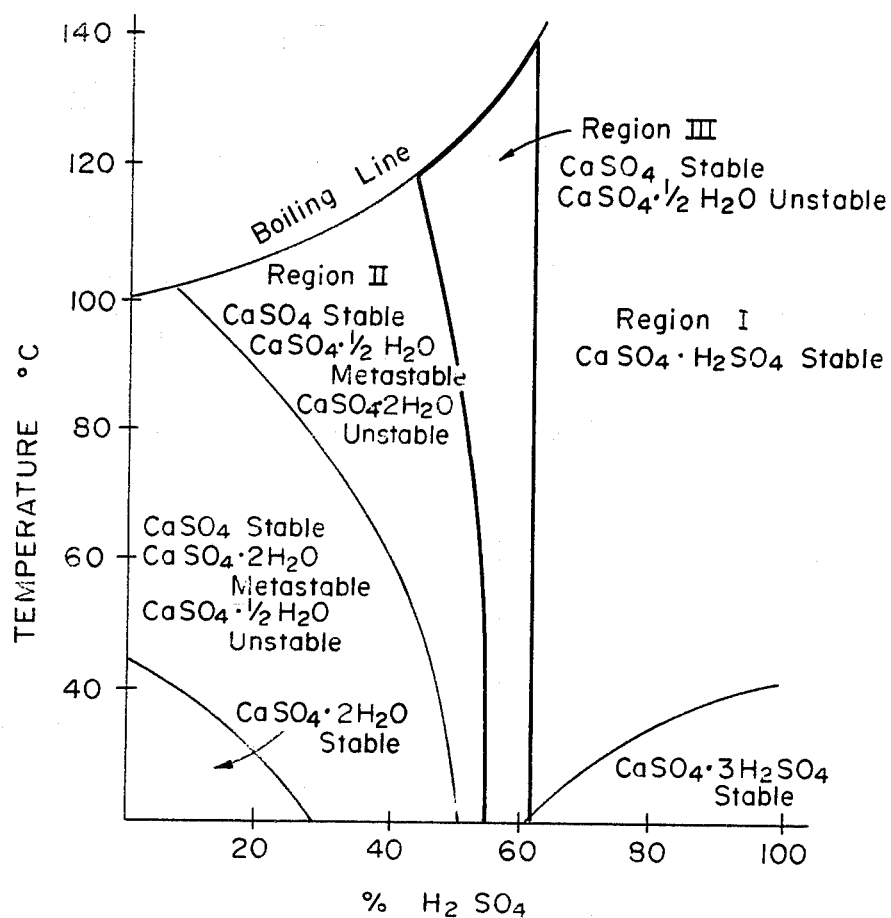
FIG. 1 is a plot of sulfuric acid concentration versus temperature showing the states of hydration of the calcium sulfate.

In the first step for purifying the waste product phosphogypsum in accordance with the process of this invention, a concentrated sulfuric acid is used to digest the gypsum at elevated temperatures. As part of the present invention, it has been found that a stable anhydrite crystal is rapidly formed in Region III delineated in bold lines in FIG. 1. To the left of the desired area in Region II of this diagram it has been found that there is an energy level kinetics problem. A metastable hemihydrate is first formed requiring extensive energy and/or time for conversion to a stable anhydrite crystal. On the right hand side of the desirable area, in Region I in FIG. 1, there is a deleterious acid or double salt formation. In Region III, between about 55-63% $H_2SO_4$ and below the boiling line, anhydrite is precipitated directly through the dehydration of the gypsum.

Thus, generally an aqueous sulfuric acid having a concentration in the range from about 55-63% $H_2SO_4$ by weight is employed in the reaction of the invention. Slightly more dilute solutions may be employed, if desired, to operate at the borderline to the metastable hemihydrates (Region II) through the addition of seed crystals of anhydrite in amounts of about 5-40% by weight of the solids present in the slurry. However, the closer one gets to the border or the more one extends over the border into Region II the risk of incomplete conversion increases, delaying the process and risking metastable hemihydrate formation with the potential difficulty of having it set up in the equipment.

Figure 2:
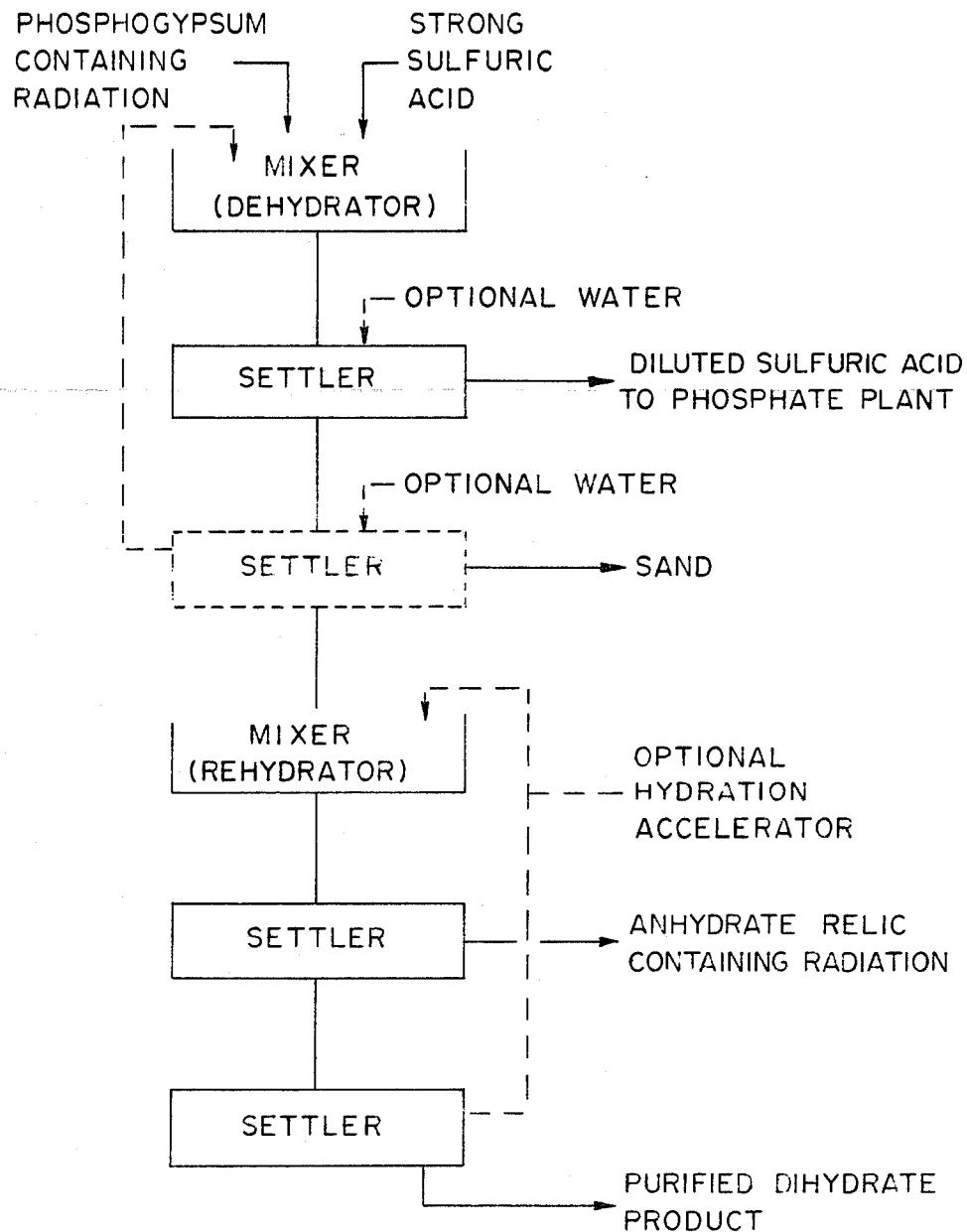
FIG. 2 is diagrammatic flow chart illustrating one preferred method of the present invention.

Thus, referring to FIG. 2, an aqueous sulfuric acid of about 50-100 weight % sulfuric acid is added to the dehydrator at temperatures ranging from about 40° C. to boiling. Preferably, the sulfuric acid feed will be about 55 to 96 weight %. The sulfuric acid is mixed in the dehydrator with phosphogypsum in proportions to form a slurry of about 10% to about 60% solids, preferably about 30-50%. Since the phosphogypsum contains about 20% water of crystallization and slurries contain more water, increased amounts of phosphogypsum in the mixture allows higher concentrations of sulfuric acid to be added. The phosphogypsum may be fed directly from a wet process phosphate plant. It may also be obtained from the gypsum ponds and stockpiles.

The dehydrator may be any mixing vessel or reactor conventional to the wet process method and may be single stage or multiple celled digesting tank or attack tanks.

In the first stage crystallization, in the dehydrator mixer as shown in FIG. 2, the phosphogypsum containing the radiation reacts rapidly with strong sulfuric acid to form anhydrite. The anhydrite crystals obtained in the dehydrator will be generally about 1-25 micrometers in size, preferably 5-15 micrometers. If the crystals are allowed to grow much larger than about 25 micrometers, difficulties in separation after the second stage recrystallization may occur with conventional separation equipment. Crystals less than about 1 micrometer will tend to end up as particles of contaminated relic adhering to the dihydrate crystals in the second stage recrystallization.

It has been found that the phosphogypsum may contain considerable quantities of silica sand. After reaction, as shown in FIG. 2, the slurry is optionally passed to conventional industry separation equipment such as a hydrocyclone or settler. The silica sand is quite coarse and is readily separated from the sulfuric acid anhydrite aqueous slurry by conventional classification means, preferably after separation of the about 60% sulfuric acid product and optional dilution of the anhydrite slurry to about 10% sulfuric acid with water. Thereafter, the slurry passes through a second classification means to separate the anhydrite crystals containing the radioactive contamination from the now diluted sulfuric acid solution. The dehydration of the phosphogypsum to anhydrite is an endothermic reaction thereby cooling the slurry, and the release of water of recrystallization dilutes the concentrated sulfuric acid. As a result the conventional dilution cooler for the sulfuric acid feed and the flash cooler in the attack tank may be eliminated in the phosphoric acid plant. The sulfuric acid is generally diluted to about 50-60% making it suitable for direct addition to phosphate rock attack tanks.

The separated anhydrite crystals, containing some sulfuric acid, thereupon pass to the second stage crystallization, the rehydrator as shown in FIG. 2. This again is a conventional attack (reactor) tank and is operated at about 0°-42° C., generally at ambient temperature. Optionally, the anhydrite may first be washed with water counter-currently to dilute it to the desired sulfuric acid concentration for rehydration of the anhydrite, and the wash water may be sent to the phosphoric acid plant for further dilution of the separated sulfuric acid stream.

In the rehydrator, the anhydrite crystals are mixed with an aqueous slurry of gypsum seed crystals and optional additional soluble sulfate(s) hydration accelerator. About 10% sulfuric acid not washed free from the anhydrite in the settler(s) acts as accelerator. After steady state continuous operation is established, the slurry is recycled with the gypsum stream and any necessary make up accelerator added to the anhydrite slurry. The slurry is mixed with anhydrite to have a total suspended solids of about 10-60 weight %, generally 30-50 weight %. The gypsum seed crystals are added in a weight proportion of about 10-90, and preferably 50-75 parts of gypsum seed to 90-10, and preferably 50-25, parts of anhydrite. The gypsum seed will be of coarse particle size about 30-100 or more micrometers and preferably about 40 micrometers for rapid hydration and subsequent separation. The soluble sulfate(s) hydration accelerator is for the most part provided by the sulfuric acid residual with the anhydrite. It is preferred that about 1-20 weight % solutions of a souble sulfate accelerator such as sulfuric acid, sodium sulfate, sodium bisulfate, potassium sulfate, magnesium sulfate, ammonium sulfate, aluminum sulfate, ferrous sulfate, ferric sulfate, zinc sulfate and the like and mixtures thereof, be utilized. Mixtures are preferred and particularly preferred mixtures are from about 1-10% of sulfuric acid with about 1-10% and especially 1-5% of sodium sulfate.

During the second stage crystallization, calcium and sulfate ions are leached out of the anhydrite crystal containing radioactive contamination and the calcium and sulfate ions recrystallized upon the purified gypsum seed crystals to grow into larger, coarser calcuim sulfate dihydrate crystals. By not converting all of the anhydrite crystal, the radium contamination remains behind on the anhydrite crystal relic. Provided the anhydrite crystal relic remains of a size on the order of about 1-25 micrometers, preferably greater than 1 or 2 micrometers with 5-15 being particularly preferred, there is little or no adhering of the radiation contaminated anhydrite crystal relic on the surface of the purified gypsum crystals in the ensuing separation. Thus, it is preferred that about 5-70% and more preferably, depending upon the level of radioactive contamination that may be tolerated, on the order of about 50% of the anhydrite not be converted to gypsum. The anhydrite relic acts as a good concentrator for the radium and is processed for disposal in the usual manner for low level radioactive waste.

As further shown in FIG. 2, the slurry from the rehydrator is passed through conventional separation equipment to separate the anhydrite relic first and then preferably in a second separator to spearate a recycle stream and a purified calcium sulfate dihydrate product. By using about 40 micrometers as a minimum size for the seed crystals, the growing dihydrate on the seed crystals in the rehydrator produces a purified gypsum granule readily separated in conventional phosphate industry separation equipment. Recycling about 30-75% of the purified gypsum product, and preferably 50-75%, as the gypsum seed crystals results in a very rapid rate of conversion.

EXAMPLE

A phosphogypsum from a modified Prayon phosphoric acid manufacturing plant using Florida phosphate rock was obtained. An activity count on the material showed it to have 26±3 pCi/g radium 226. The material also had the following analysis: 28.7% CaO, 42.8% $SO_3$, 5.1% $SiO_2$, 0.37% $Fe_2O_3$, 0.11% $Al_2O_3$, 0.24% P, less than 0.1% F and 19.4% combined $H_2O$.

Figure 3:
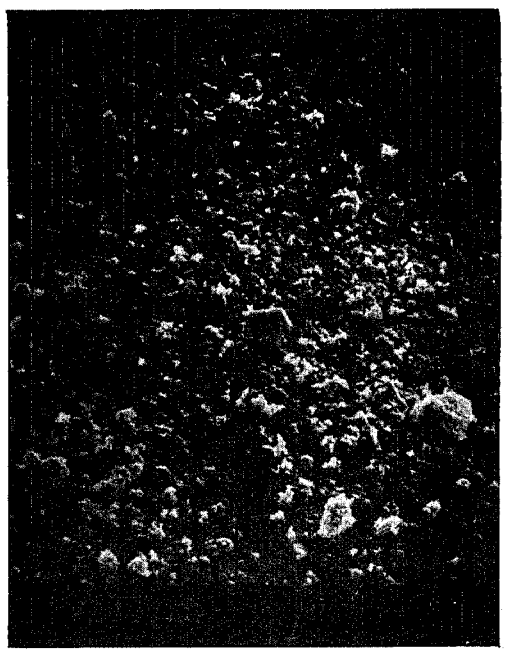
FIGS. 3 and 4 are scanning electron microphotographs of anhydrite particles and gypsum particles produced during the practice of the present invention.

600 parts by weight of the phosphogypsum and 1189 parts by weight of 67% sulfuric acid at 106° C. were charged to the dehydrating zone. During 45 minutes of mixing in the dehydrating zone, the temperature dropped to 51° C. and the phosphogypsum was dehydrated to anhydrite. The resultant slurry was passed to the first separation zone and the sulfuric acid product filtrate was drawn off. The product sulfuric acid was analyzed to be 59.5% sulfuric acid and passes on to acidulation of phosphate ore. The filter cake containing 358 parts of anhydrite plus some gangue from the phosphoric acid operation was washed with several volumes of water and screened through a 270 U.S. Standard mesh (53 micrometers) screen to remove silica sand. The anhydrite filter cake was then found to have a count of 31±3 pCi/g of radium 226 and had the following analysis: 37.9% CaO, 54.8% $SO_3$, 0.12% $SiO_2$, less than 0.05% $Fe_2O_3$, less than 0.05% $Al_2O_3$, 0.04% P, less than 0.01% F and 0.95% free $H_2O$. Scanning electron microphotographs, FIG. 3, showed the anhydrite crystals to be just a few micrometers in size. This anhydrite was split into two portions for conversion to high purity, low-radioactivity gypsum.

To a rehydrating mixing vessel was charged 180 parts by weight of the anhydrite containing radioactive contamination and a dilute slurry containing 600 parts by weight of water, 31 parts by weight of sulfuric acid accelerator and 20 parts by weight of gypsum seed crystals. Most of the sulfuric acid accelerator was present for acceleration from the anhydrite in the first phase, which was not completely washed before addition to this phase. The mixture in the rehydrator was stirred at ambient temperature for 47 hours. Sampling at that time showed 87% of the anhydrite had converted to gypsum. The slurry then was passed to the second separation zone and, with wet screening and water washing, classified into the following fractions:

none greater than 50 U.S. standard mesh (297 micrometers)

9.8 weight % retained on U.S. standard 100 mesh (150 micrometers)

20.6 weight % passing 100 mesh and retained on 200 U.S. standard mesh (74 micrometers)

0.2 weight % by weight passing 200 mesh and retained on 270 mesh (53 micrometers)

and 69.4 weight % by weight passing 270 mesh (53 micrometers).

Figure 4:
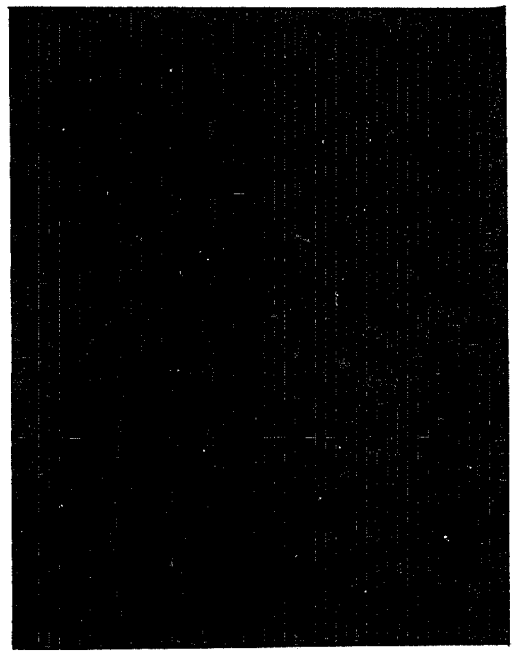

The fine fraction, passing 53 micrometers and shown in FIG. 3, was found to be gypsum crystallites and crystal relics of anhydrite and upon counting contained 30±3 pCi/g of radium 226. The coarser fractions greater than 74 micrometers, shown in FIG. 4, where found to be mostly large gypsum particles but with some particles of anhydrite relic fragments on the surface, and counted to have 2.3±0.09 pCi/g of radium 226. The 53-74 micrometers fraction was suitable for recycle seed crystals.

Another 100 parts by weight of the anhydrite obtained above, 600 parts by weight of water, 60 parts by weight of sodium sulfate accelerator and 100 parts by weight of the +53 micrometers gypsum as seed crystal (that was found to contain some 3 parts by weight calcium carbonate) was charged to the rehydrator and mixed at ambient temperature for 47 hours. Analysis showed 71% of the anhydrite converted to gypsum. The slurry was then passed to the second separation zone, wet screened and water washed to the following fractions:

no parts greater than 50 mesh 22.8 weight % passing 50 mesh and retained on 100 mesh;

62.3 weight % passing 100 mesh and retained on 200 mesh;

2.3 weight % passing 200 mesh and retained on 270 mesh; and 12.6 weight % passing 270 mesh.

The +200 mesh (+74 micrometers) fraction was air screened to remove some of the anhydrite relic from the gypsum and, on analysis was found to give 1.7±0.2 pCi/g of radium 226. Had larger anhydrite crystals been grown in the dehydrator section, as by optionally including a small amount of anhydrite seed crystals (10-50% of the solids by weight), changing the total solids, time, temperature or sulfuric acid concentration of that slurry in the dehydrator would result in less anhydrite particles fragment on the gypsum and/or less of the anhydrite containing radioactive contamination being converted to gypsum, thereby providing lower radioactivity levels in the coarse gypsum fraction, e.g. less than 1 pCi/g of radium 226. Further, more complete washing and classification as by increased washes, greater separations in particle sizes or higher efficiency separators or centrifuges would lead to less anhydrite particle dusting on the purified gypsum.

The anhydrite relic filter cake may be disposed of. One means is to admix for example about 10-40 weight % of the radioactive anhydrite with 10 to 40% phosphatic clay slime from the phosphate ore beneficiation plant containing about 80% water. This sufficiently dilutes the material that radioactivity is not a concern. In about 3-6 weeks the water from the clay slime hydrates the anhydrite and it crystallizes to form a gypsum binder to set up the mass forming a strong stable material. This material, and mixtures of it with up to about equal weight of sand tailings from the phosphate ore beneficiation plant may be used for land reclamation of mined-out areas; road base stabilization or the like.

The gypsum filter cake is of a purity and particle size for ready deagglomerating and use as gypsum raw material source for calcination to industrially usable forms such as building plasters or gypsum wallboard.

What is claimed is:

1. A process for reducing radioactivity in waste product phosphogypsum containing radioactive contamination comprising the steps of dehydrating the phosphogypsum to calcium sulfate anhydrite containing radioactive contamination;

in the presence of radiation free gypsum seed crystals rehydrating a substantial proportion, but less than all, of the anhydrite, to a substantially free of radioactivity gypsum of larger particle size than the anhydrite;

and separating the larger particle size gypsum from the anhydrite containing radioactive contamination.

2. The process of claim 1 wherein about 5-70 weight % of the anhydrite remains unrehydrated.

3. The process of claim 1 wherein about 10-30 weight % of the anhydrite remains unrehydrated.

4. The process of claim 1 wherein the phosphogypsum is dehydrated to anhydrite of about 1-25 micrometers particle size and a portion thereof is rehydrated to gypsum of about 30-100 micrometers particle size.

5. A process for reducing radioactive contamination in waste product phosphogypsum which comprises:

(a) feeding phosphogypsum containing radioactive contamination, water and sulfuric acid to a dehydrating zone and mixing them to form a slurry, the quantities being charged to the dehydrating zone being such as to provide a slurry comprising by weight about 50-70% sulfuric acid and about 10-60% total solids at a temperature of about 70°-140° C.;

withdrawing an anhydrite slurry from said dehydrating zone and passing it to a first separation zone to separate sulfuric acid and anhydrite;

withdrawing product sulfuric acid from the first separation zone withdrawing anhydrite containing radioactive contamination from the first separation zone;

(b) feeding said anhydrite, conventional hydration accelerator, and gypsum seed crystals to a rehydrating zone and mixing them to form a second slurry, the quantities being charged to the rehydrating zone being such as to provide a second slurry comprising by weight about 1-20% accelerator and about 10:90 to 90:10 proportions of gypsum to anhydrite, converting a substantial proportion but not all of the anhydrite to gypsum;

(c) passing the second slurry to a second separation zone to separate unconverted anhydrite and gypsum;

withdrawing anhydrite containing radioactive contamination; and withdrawing substantially radioactive contamination free gypsum product.

6. The process of claim 5 including the steps of withdrawing a portion of said substantially radioactive contamination free gypsum from the second separation zone and returning it to the rehydrating zone.

7. The process of claim 5 wherein about 5-70 weight % of the anhydrite in the rehydrating zone remains unrehydrated to gypsum; is withdrawn from the second separation zone and is passed to disposal.

8. The process of claim 5 wherein about 60% sulfuric acid is fed to the dehydrating zone and about 50% sulfuric acid is withdrawn from the first separation zone.

9. The process of claim 5 wherein the slurry in the dehydrating zone has about 30-50% total solids.

10. The process of claim 5 wherein the anhydrite passed to the first separation zone has a particle size of about 1-25 micrometers.

11. The process of claim 10 wherein the anhydrite particle size is about 5-15 micrometers.

12. The process of claim 5 wherein the gypsum seed crystal fed to the rehydrating zone has a particle size of about 30-100 micrometers.

13. The process of claim 5 wherein the substantially radioactive contamination free gypsum separated from the second separation zone has a particle size of about 30-60 micrometers.

14. The process of claim 5 wherein the particle size of the anhydrite crystal remaining unhydrated is about 5-25 micrometers.

15. The process of claim 6 wherein about 10-90% of the gypsum is recycled to the rehydrating zone.

16. The process of claim 15 wherein about 50-75% of the gypsum is recycled.

17. The process of claim 11 including separating the gypsum into at least two different sized fractions, withdrawing the larger sized fraction as gypsum product and recycling the smaller sized fraction.

* * * * *